US008366175B2

(12) United States Patent
Schmitt

(10) Patent No.: US 8,366,175 B2

(45) Date of Patent: Feb. 5, 2013

(54) DOOR CHECKER DRIVE MECHANISM

(75) Inventor: Matthew Weyand Schmitt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 12/770,099

(22) Filed: Apr. 29, 2010

(65) Prior Publication Data

US 2011/0266080 A1 Nov. 3, 2011

(51) Int. Cl.
*B60J 5/04* (2006.01)

(52) U.S. Cl. ..................... 296/146.4; 296/155; 16/86 B; 16/86 C

(58) Field of Classification Search ............... 296/146.4, 296/146.11, 146.12, 155; 16/86 B, 86 C; 49/502; 180/89.1
See application file for complete search history.

(56) References Cited

U.S. PATENT DOCUMENTS

| | | | | | |
|---|---|---|---|---|---|
| 1,151,479 | A | | 8/1915 | Kurtz | |
| 2,321,286 | A | | 6/1943 | Etsel et al. | |
| 2,628,091 | A | | 2/1953 | Rappl | |
| 3,061,362 | A | * | 10/1962 | Maruyama | 296/146.4 |
| 3,266,381 | A | * | 8/1966 | Rohde | 91/420 |
| 4,211,431 | A | * | 7/1980 | Awano et al. | 280/804 |
| 5,228,239 | A | | 7/1993 | Heo | |
| 6,075,298 | A | * | 6/2000 | Maue et al. | 310/12.14 |
| 6,370,732 | B1 | * | 4/2002 | Yezersky et al. | 16/85 |
| 6,382,706 | B2 | * | 5/2002 | Yuge et al. | 296/146.4 |
| 6,473,936 | B2 | * | 11/2002 | Orita | 16/82 |
| 6,513,859 | B2 | * | 2/2003 | Yuge | 296/146.4 |
| 7,222,459 | B2 | * | 5/2007 | Taniyama | 49/280 |
| 7,438,346 | B1 | * | 10/2008 | Breed | 296/146.4 |
| 7,640,627 | B2 | * | 1/2010 | Lowen et al. | 16/86 C |
| 7,648,192 | B2 | | 1/2010 | Herline et al. | |
| 2005/0127711 | A1 | * | 6/2005 | Rigorth et al. | 296/146.4 |
| 2007/0063536 | A1 | * | 3/2007 | Okada et al. | 296/146.4 |

FOREIGN PATENT DOCUMENTS

| | | | | |
|---|---|---|---|---|
| KR | 2005045396 | A | * | 5/2005 |

* cited by examiner

*Primary Examiner* — Glenn Dayoan
*Assistant Examiner* — Pinel Romain
(74) *Attorney, Agent, or Firm* — Clifford B. Vaterlaus; Emerson Thomson Bennett

(57) ABSTRACT

A door checker drive mechanism for use in automatically opening a door may include: a door checker that limits the motion of the associated door; a power source that rotates a shaft; and, a drive train that interconnects the power source to the door. The door checker drive mechanism may be adjustable between: a first condition where the power source causes the door to open or close with respect to the body; and, a second condition where the power source cannot cause the door to open or close and the door may be manually opened or closed.

20 Claims, 8 Drawing Sheets

DOOR CHECKER DRIVE MECHANISM

I. BACKGROUND

A. Field of Invention

This invention generally relates to methods and apparatuses concerning vehicle doors and more specifically relates to methods and apparatuses concerning the automatic opening of a vehicle door.

B. Description of the Related Art

It is well known in the automotive industry to provide vehicle doors with a door checker to limit the motion of the door. It is also known to provide vehicle doors with a power source so that the door can be opened automatically. While known door checkers and automatically opening doors generally work well for their intended purposes, it is desirable to advance the technology and provide an integrated door checker drive mechanism.

II. SUMMARY

According to one embodiment of this invention, a vehicle comprises: a frame; at least one ground engaging wheel mounted to the frame; a locomotion source mounted to the frame and used in providing locomotion for the vehicle; a body that is mounted to the frame and that has first and second surfaces; a door having first and second surfaces, wherein the first surface of the door is pivotally attached to the first surface of the body so that the door is pivotal with respect to the body between an open position granting access to the interior of the body and a closed position preventing access to the interior of the body; and, a door checker drive mechanism comprising: a door checker that limits the motion of the door; the door checker comprising: a first surface attached to the second surface of the body; and, a second surface attached to the second surface of the door; an electric power source that rotates a shaft; a drive train that interconnects the electric power source to the door, the drive train comprising: a first gear operatively attached to the door checker, a second gear operatively attached to the shaft; and, a third gear; and, a control system supported to the frame for use in controlling the door checker drive mechanism and comprising an activation device. The activation device may be manually activateable to adjust the door checker drive mechanism between: (1) a first condition where the second gear is engaged with the third gear; the third gear is engaged with the first gear; and, the power source rotates the shaft and causes the door to pivot with respect to the body; and, (2) a second condition where at least one of the first and second gears is not engaged with the third gear; the power source cannot cause the door to pivot with respect to the body; and, the door is manually pivotal with respect to the body.

According to one embodiment of this invention, a door checker drive mechanism for use with an associated body and door that is moveable with respect to the body between an open position granting access to the interior of the body and a closed position preventing access to the interior of the body, may comprise: a door checker that limits the motion of the associated door, the door checker comprising: a first surface attachable to the associated body; a second surface attachable to the associated door; and a first power transfer member; a power source that rotates a shaft; and, a drive train that interconnects the power source to the associated door, the drive train comprising: a first power transfer member operatively attached to the door checker, a second power transfer member operatively attached to the shaft; and, a third power transfer member. The door checker drive mechanism may be adjustable between: (1) a first condition where the second power transfer member engages the third power transfer member; the third power transfer member engages the first power transfer member; and, the power source rotates the shaft and causes the associated door to move with respect to the body; and, (2) a second condition where at least one of the first and second power transfer members is not engaged with the third power transfer member; the power source cannot cause the associated door to move with respect to the body; and, the associated door is manually moveable with respect to the body.

According to yet another embodiment of this invention, a method may comprise the steps of: (A) providing a vehicle comprising: a frame; at least one ground engaging wheel mounted to the frame; a body that is mounted to the frame; and, a door that is moveable with respect to the body between an open position granting access to the interior of the body and a closed position preventing access to the interior of the body; (B) providing a door checker drive mechanism comprising: a door checker that limits the motion of the door; a power source that rotates a shaft; a drive train that interconnects the power source to the door, the drive train comprising: a first power transfer member operatively attached to the door checker, a second power transfer member operatively attached to the shaft; and, a third power transfer member; and, a control system for use in controlling the door checker drive mechanism that comprises an activation device; (C) manually adjusting the door from the closed position to the open position by: (1) manually adjusting a door latch operatively connected to the door and the body; and, (2) manually moving the door with respect to the body; and, (D) automatically adjusting the door from the closed position to the open condition by: (1) activating the activation device; (2) engaging the second power transfer member with the third power transfer member; (3) engaging the third power transfer member with the first power transfer member; and, (4) rotating the shaft to cause the door to move with respect to the body.

One advantage of this invention is that a door can be automatically opened and closed.

Another advantage of this invention is that a door can be remotely opened and closed.

Yet advantage of this invention is that a door checker drive mechanism may provide impact absorption characteristics.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

Figure 4:
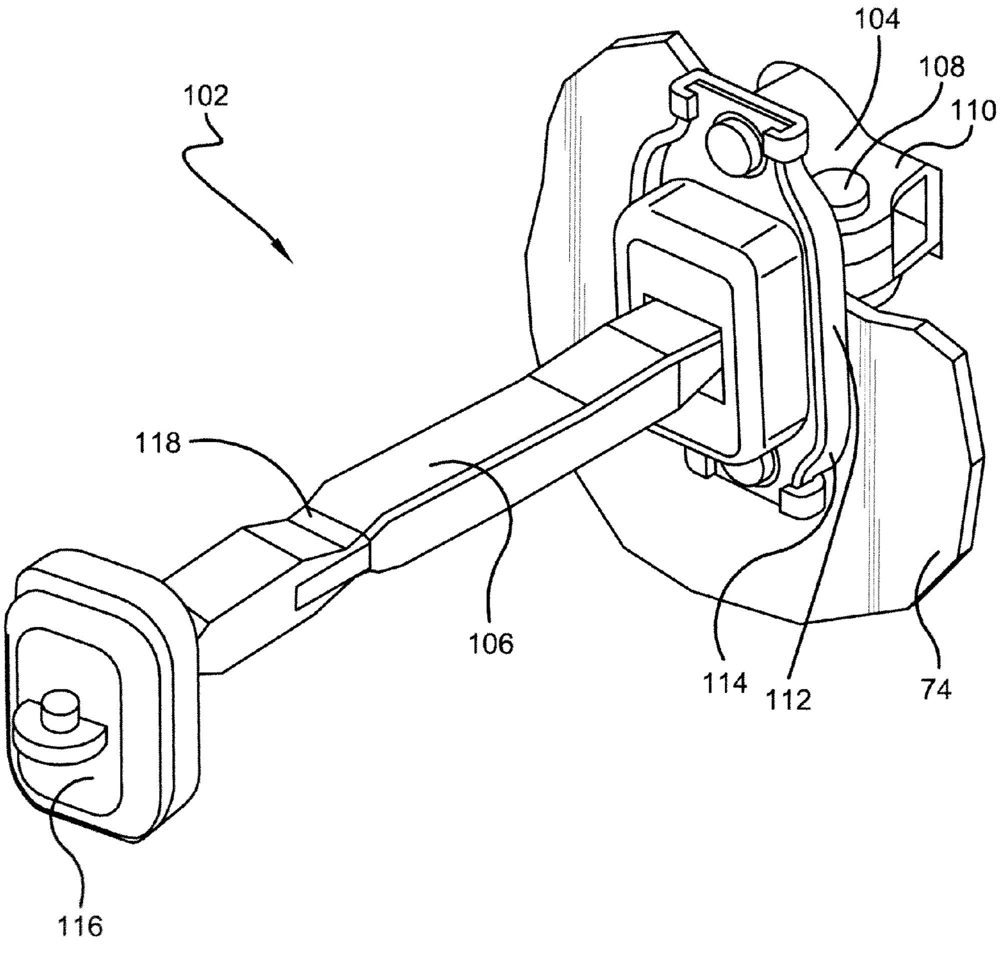

FIG. 4 a perspective view of a door checker.

Figure 5A:
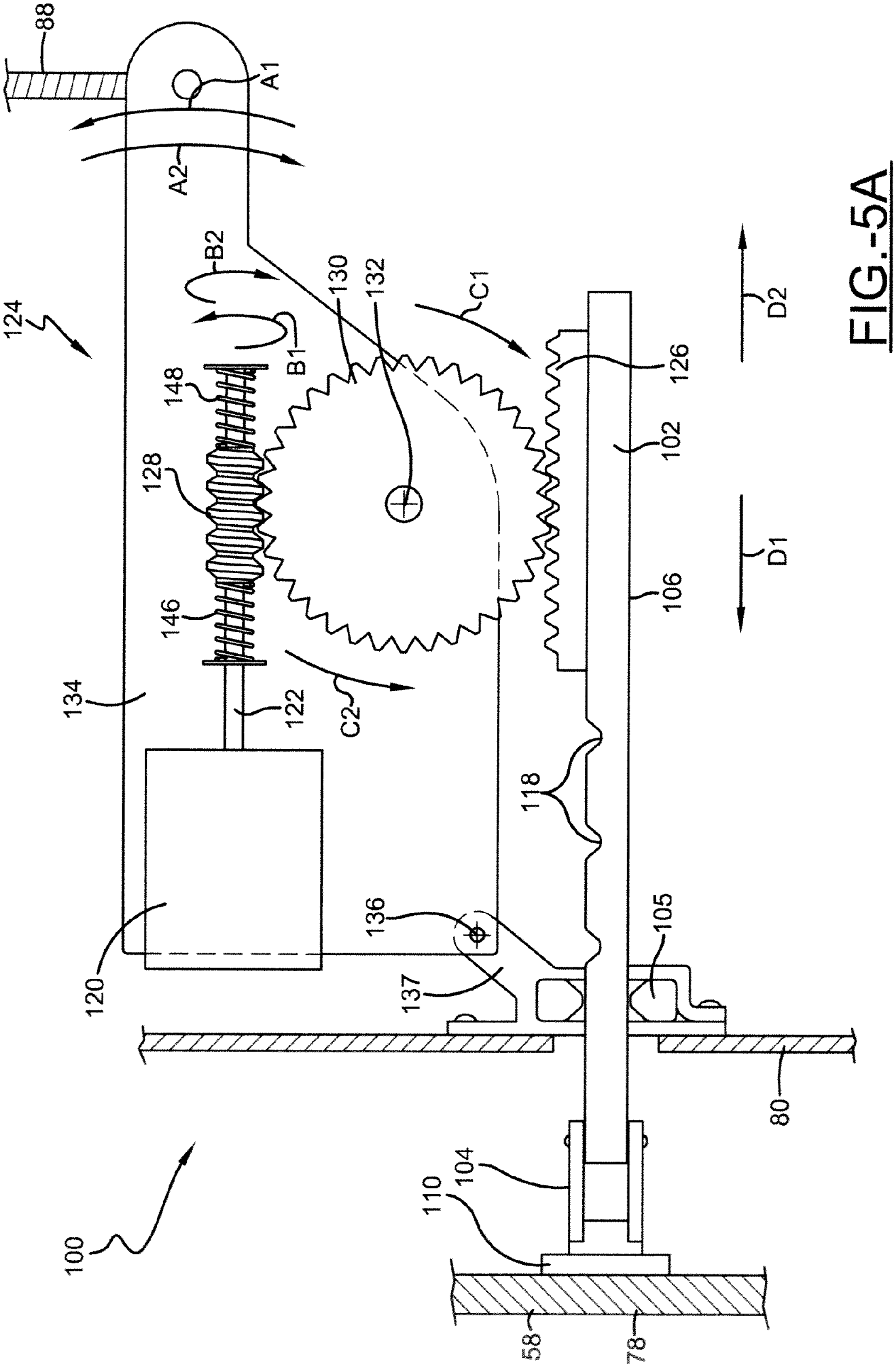

FIG. 5A is a diagram showing the operation of a door checker drive mechanism in a first condition.

Figure 5B:
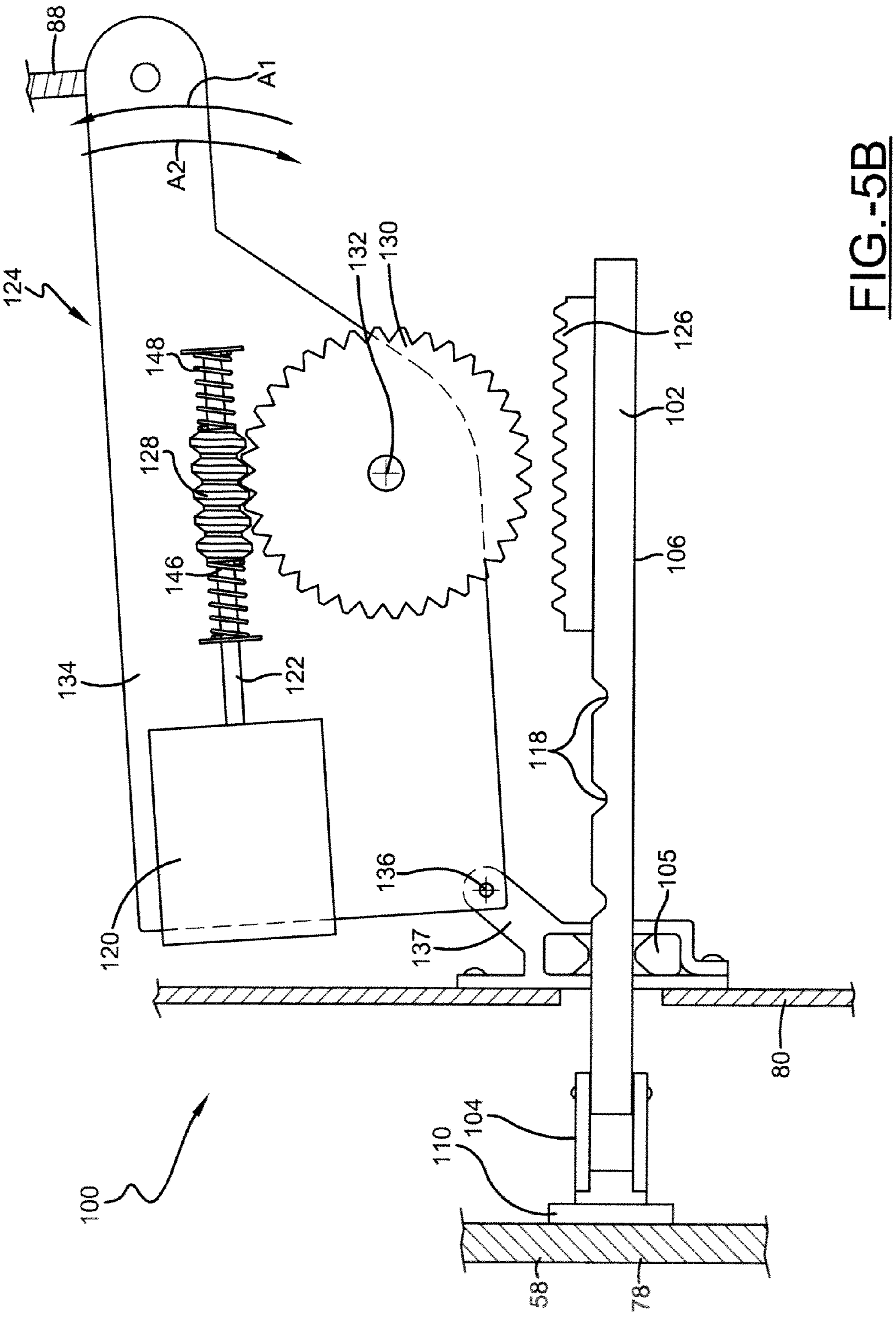

FIG. 5B is a view similar to that shown in FIG. 5 but showing the door checker drive mechanism in a second condition.

Figure 6:
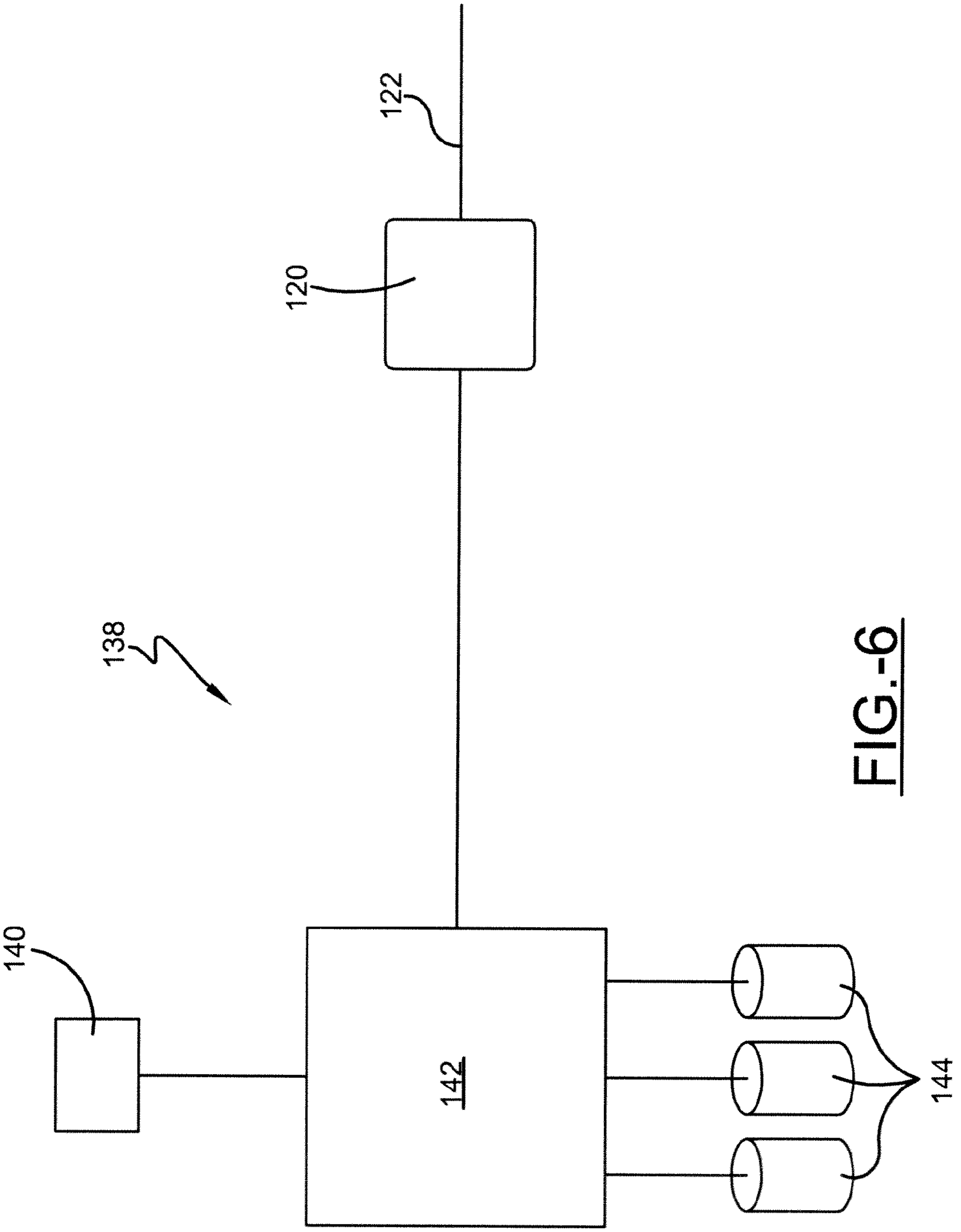

FIG. 6 is a diagram showing how a door checker drive mechanism may be controlled.

Figure 7:
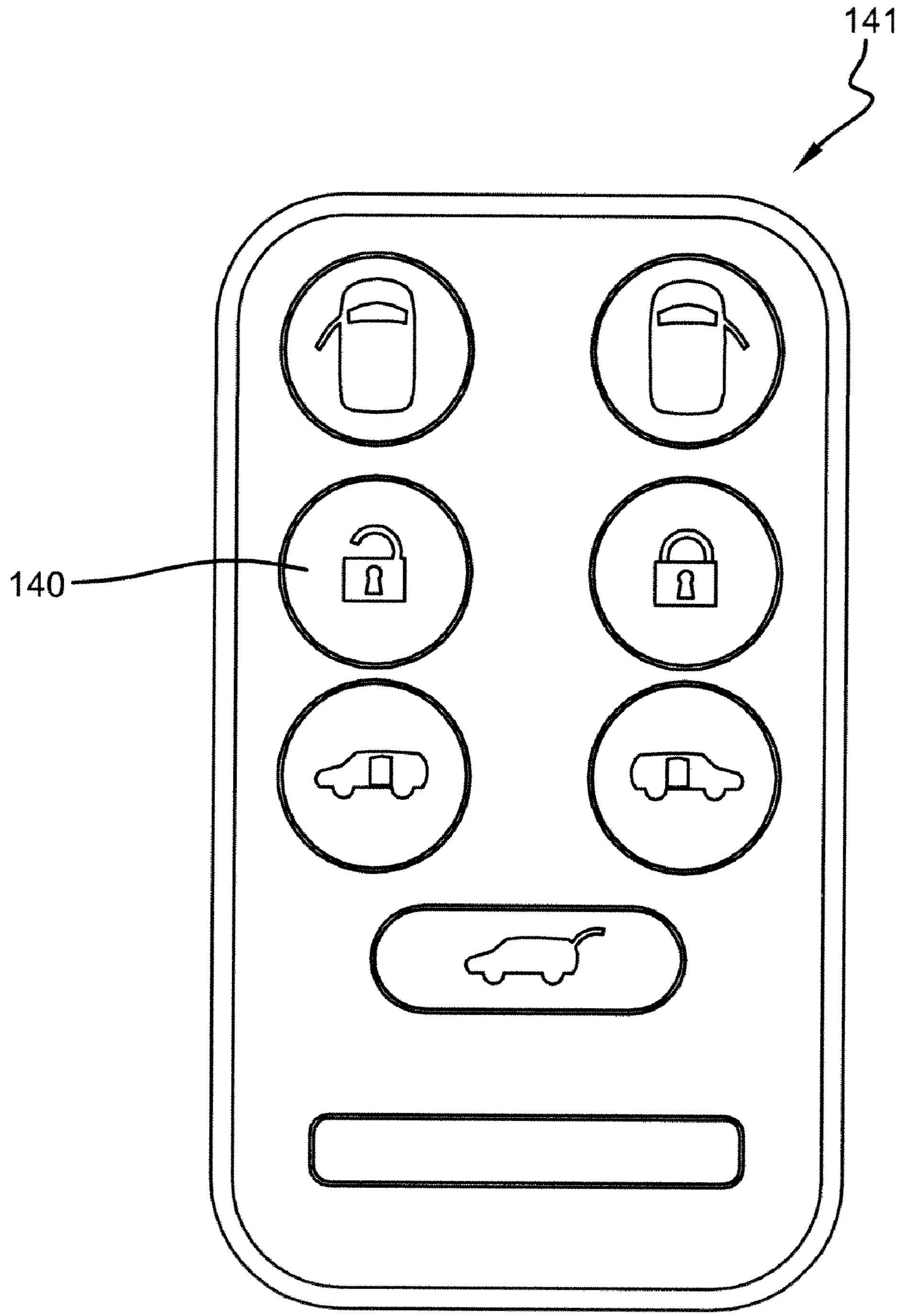

FIG. 7 is a close up view of a key fob.

IV. DETAILED DESCRIPTION

Figure 1:
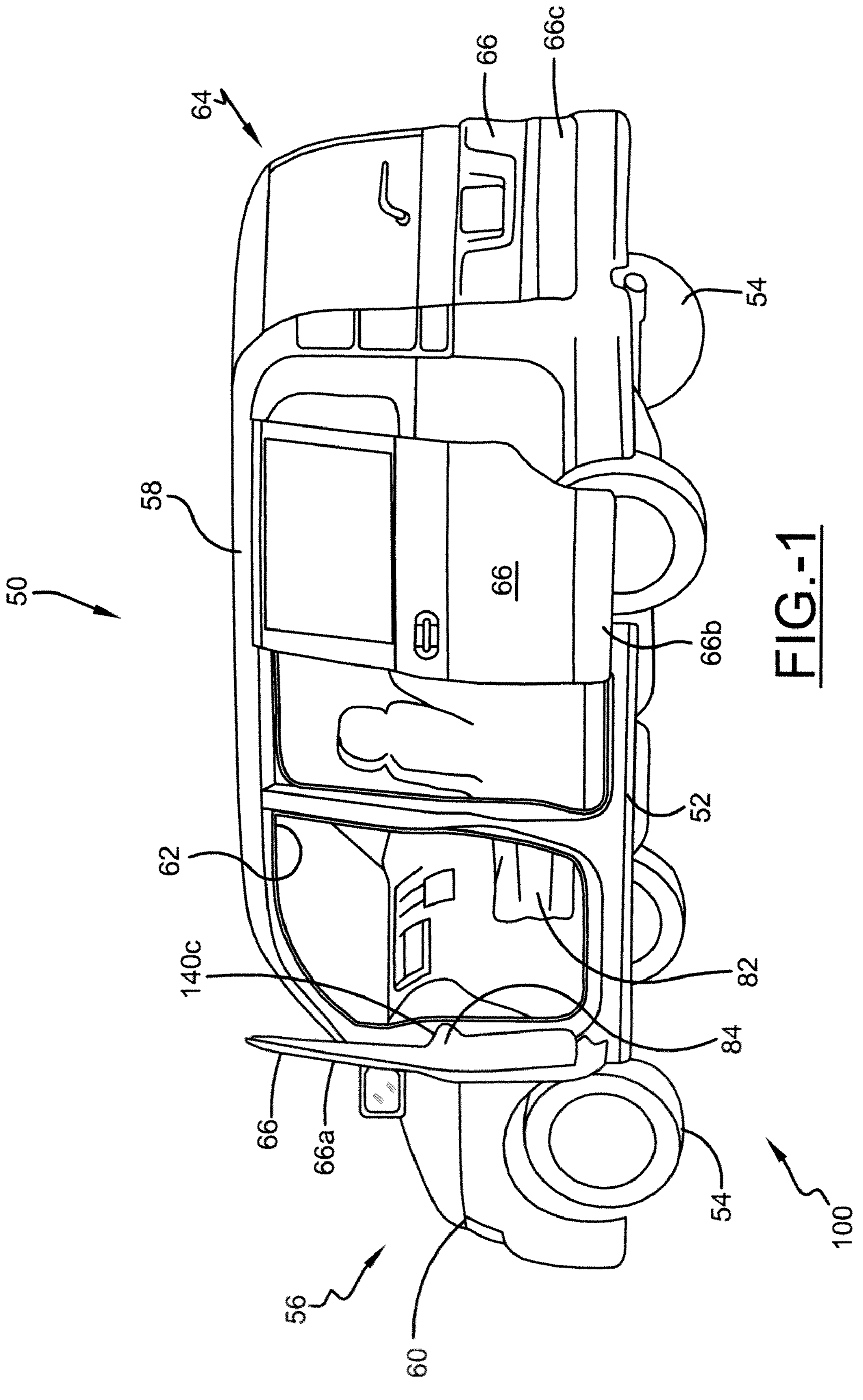
FIG. 1 is a perspective left side view of a vehicle.
Figure 2:
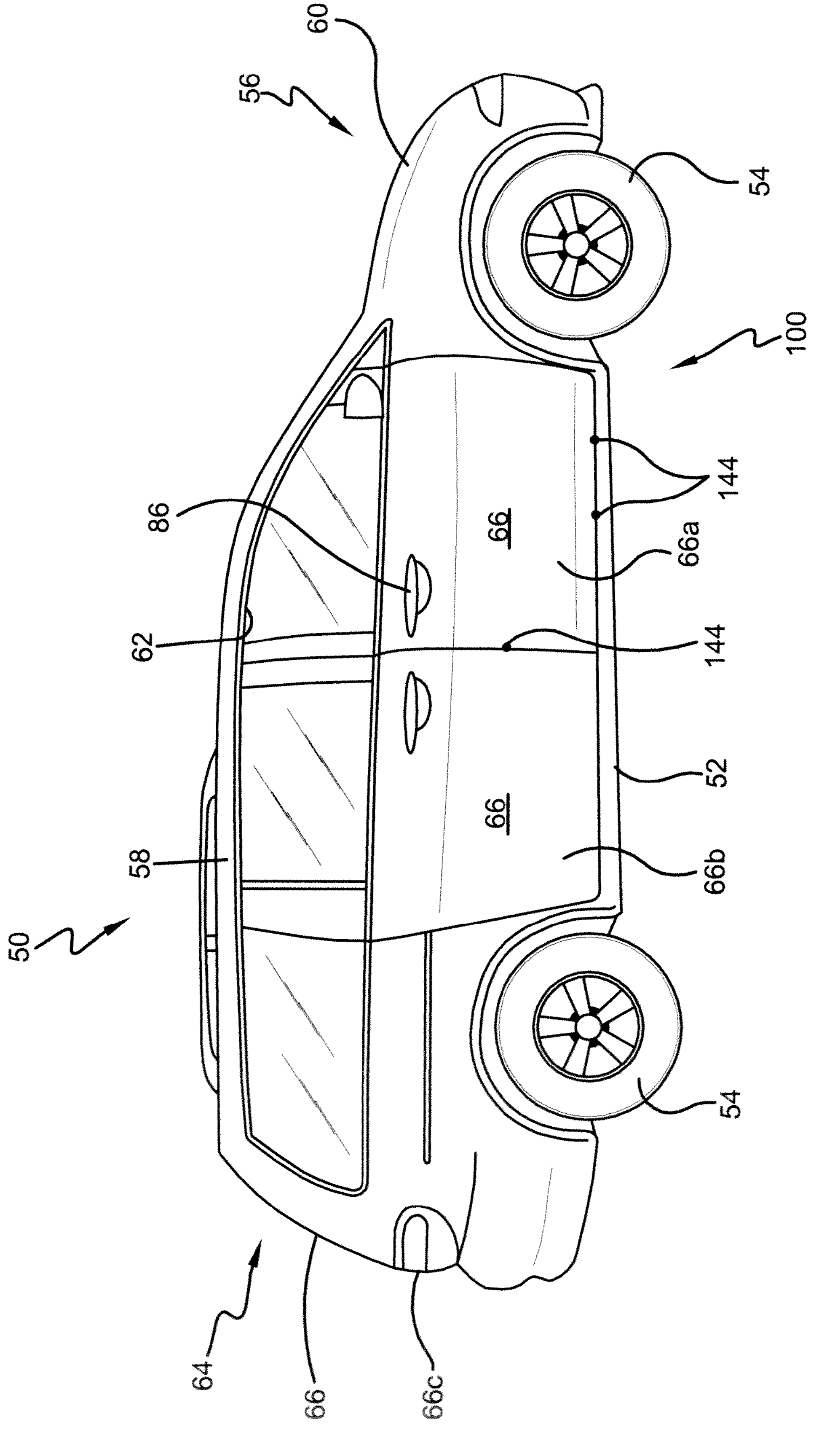
FIG. 2 is a right side view of the vehicle shown in FIG. 1.

Referring now to the drawings wherein the showings are for purposes of illustrating embodiments of the invention only and not for purposes of limiting the same, and wherein like reference numerals are understood to refer to like components, FIGS. 1 and 2 show a vehicle 50 that may be equipped with one or more door checker drive mechanisms 100 according to this invention. While the vehicle 50 shown is a van, it is to be understood that the door checker drive mechanism 100 of this invention will work with any vehicle chosen with the sound judgment of a person of skill in the art and may have non-vehicle applications as well. The vehicle 50 may include a frame 52, one or more ground engaging wheels 54 mounted to the frame 52, and a locomotion source 56, such as an engine or motor, mounted to the frame 52, for use in providing locomotion for the vehicle 50. The vehicle 50 may also have a body 58 mounted to the frame 52 and that defines one or more compartments. The body may define, for some non-limiting examples, a locomotion compartment 60 which houses the locomotion source 56, a passenger compartment 62 which houses one or more passengers, and a storage compartment 64 which may be used to house luggage or other cargo. The vehicle 50 may also have at least one door 66 that is moveable with respect to the body 58 between an open position granting access to the interior of the body (and thus may provide access to one or more of the compartments 60, 62, 64) and a closed position preventing access to the interior of the body 58. The vehicle shown has a pair of doors 66*a* that pivot about a vertical axis between open and closed positions, a pair of doors 66*b* that slide parallel to a longitudinal axis of the vehicle 50 between open and closed positions, and a door 66*c* that pivots about a horizontal axis between open and closed positions (sometimes referred to as a tailgate).

Figure 3:
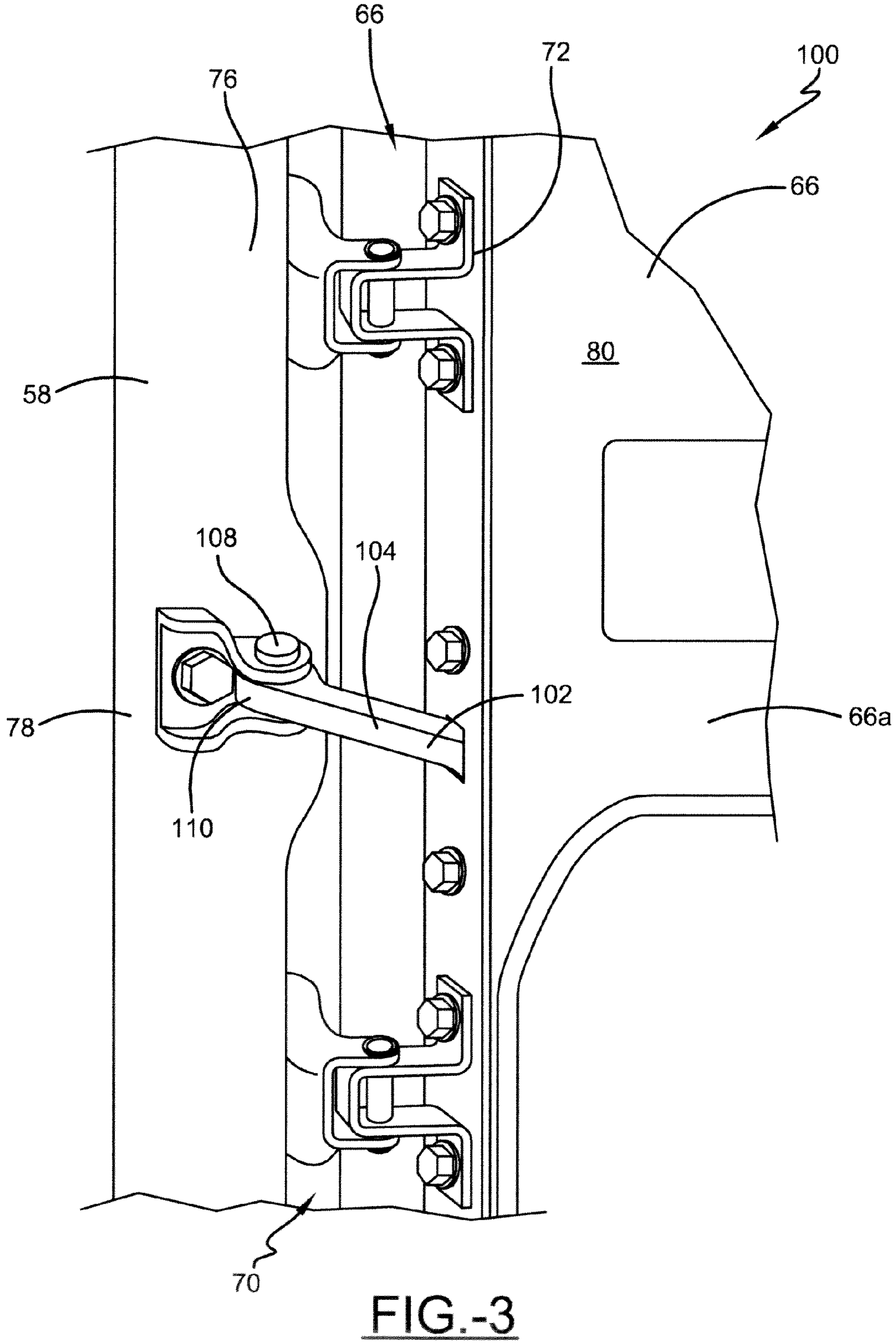
FIG. 3 is a cut-away view of a door attached to a vehicle body.

With reference now to FIGS. 1-3, in the description that follows the focus will be on the operation of the pivotal doors 66*a* (left hand door 66*a* shown in FIG. 1 and right hand door 66*a* shown in FIGS. 2 and 3). It is to be understood, however, that this invention is applicable to doors that move similar to doors 66*b* and 66*c* and other door movements as well. Each door 66*a* may be pivotally attached to the body 58 via a pair of hinges 68, 70 or in any other manner chosen with the sound judgment of a person of skill in the art. In this way a door 66*a* is pivotal with respect to the body between an open position (shown in FIG. 1) granting access to the interior of the body and a closed position (shown in FIG. 2) preventing access to the interior of the body. Thus, the door 66*a* has a first surface 72 attached to a first surface 76 of the body 58.

With reference now to FIGS. 1-4, the door checker drive mechanisms 100 may include a door checker 102 that limits the motion of the door 66*a*. The door checker 102 used with this invention can be of any type and size chosen with the sound judgment of a person of skill in the art. The door checker 102 may have a first portion 104 extending from within a door panel 80 that is attached to the body 58 via a hinge 108 or in any other manner chosen with the sound judgment of a person of skill in the art. Thus, the door checker 102 has a first surface 110 attached to a second surface 78 of the body 58. The first portion 104 may be received within a guide block 105, made of nylon or the like, for relative motion thereby. The door checker 102 may also have a second portion 106 positioned within the door panel 80 (and thus not visible in FIG. 3) that includes a base 114 that mounts to the door panel 80 or some other portion of the door 66*a* in any manner chosen with the sound judgment of a person of skill in the art. Thus, the door checker 102 has a second surface 112 attached to a second surface 74 of the door 66*a*. The door checker 102 may also have an end plate 116 which acts as an anchor when the door 66*a* is opened to full position. One or more detents 118 may be positioned on the door checker 102 to stop the motion of the door 66*a* in pre-determined positions. As the general structure and operation of a door checker is well known to those of skill in the art, further details will not be provided here.

With reference now to FIGS. 1 and 5-6, the door checker drive mechanisms 100 may also include a power source 120 that rotates a shaft 122. The power source 120 may provide its own power, such as a battery, or may itself be powered by another power source. The power source 120 may be an electric power source such as an electric motor. In one non-limiting embodiment, the power source is powered by the locomotion source 56 in any manner chosen with the sound judgment of a person of skill in the art, such as by a vehicle battery (not shown) or alternator (not shown).

With reference now to FIG. 5, the door checker drive mechanisms 100 may also include a drive train 124 that interconnects the power source 120 to the door 66*a*. While the drive train 124 may be of any type and size chosen with the sound judgment of a person of skill in the art, for the embodiment shown the drive train 124 comprises first, second, and third power transfer members 126, 128, and 130. By "power transfer member" it is meant a device that transfers power. Non-limiting examples of a power transfer members include pulleys, gears, belts, and the like. The embodiment shown uses gears as the power transfer members. When gears are used, they can be of any type and size and arranged in any manner chosen with the sound judgment of a person of skill in the art. For the embodiment shown, the first power transfer member 126 is a rack gear attached to the door checker 102, the second power transfer member 128 is a worm gear attached to the shaft 122, and the third power transfer member 130 is a spur gear that is rotatable about an axis 132.

With reference now to FIGS. 1 and 5, the door checker drive mechanisms 100 may be adjustable between: (1) a first condition, shown in FIG. 5A, where the second power transfer member 128 engages the third power transfer member 130; the third power transfer member 130 engages the first power transfer member 126; and, the power source 120 rotates the shaft 122 and causes the door 66 to move with respect to the body 58; and, (2) a second condition, shown in FIG. 5B, where at least one of the first and second power transfer members 126, 128 is not engaged with the third power transfer member 130; the power source 120 cannot cause the door 66 to move with respect to the body 58; and, the door 66 is manually moveable with respect to the body 58. For the embodiment shown, the door checker drive mechanisms 100 is adjusted from the first condition to the second condition by disengaging the third power transfer member 130 from the first power transfer member 126 in a manner to be described below.

With reference now to FIGS. 3 and 5, the door checker drive mechanisms 100 may also include a support member 134 to which the power source 120 (and thus its shaft 122) and the third power transfer member 130 is mounted. If the third power transfer member 130 is a spur gear, the spur gear may be rotatable about a pin (that defines the axis 132) that is mounted to the support member 134. In one embodiment, the support member 134 is movably attached to the door 66. While this movable attachment can be of any type chosen with the sound judgment of a person of skill in the art, for the embodiment shown the support member 134 is a plate that is pivotally attached to the door 66 via pivot pin 136. The pivot pin 136 maybe attached to a support bracket 137 that is supported to the door panel 80. When the support member 134 is moved in direction A1, the third power transfer member 130 moves relatively upward (as shown in FIG. 5) and away from the first power transfer member 126. The third power transfer member 130 is thus disengaged from the first power transfer member 126. When, however, the support member 134 is moved in direction A2, the third power transfer member 130 moves relatively downward (as shown in FIG. 5) and toward the first power transfer member 126. The third power transfer member 130 is thus engaged with first power transfer member 126.

With reference now to FIGS. 1-2 and 5-7, the door checker drive mechanisms 100 may also include a control system 138, of any type chosen with the sound judgment of a person of skill in the art, for use in controlling the door checker drive mechanism 100. For the embodiment shown, the control system 138 includes an activation device 140 that is manually activated by the operator to cause the power source 120 to rotate the shaft 122 or to stop rotating the shaft 122. The activation device 140 may be a button or lever or the like which the operator operates to close and/or open an electric switch. Some non-limiting examples of the activation device 140 include a push button 140*a* placed on a key fob 141 (see FIG. 7), a push button (not shown) positioned near the driver seat 82 (see FIG. 1) and, a push button 140*c* placed on a seat armrest 84 (see FIG. 1). Thus the activation device 140 may be positioned near or remote from the corresponding door 66*a*. The control system 138 may use a controller 142 of any type chosen with the sound judgment of a person of skill in the art, such as the vehicle's electronic control unit (ECU) or a separate controller that works separate from or along with the ECU. In one embodiment, the control system 138 may also include at least one object detection sensor 144 (three illustrated in FIGS. 2 and 6) mounted to the door 66*a* that limits and/or stops the rotation of the shaft 122 in response to the detection of an object within a predetermined distance of the door 66*a*. In this way automatic operation of the door 66*a* via the door checker drive mechanism 100 is prevented if adequate space is not available to open the door 66*a*. As the operation of object detection sensors are well known to those of skill in the art, further details will not be provided here.

With reference now to FIGS. 2 and 5, the door 66*a* may include a manually adjustable a door latch 86 that latches the door 66*a* to the body 58 in any known manner. As the operation of door latches is well known to those of skill in the art, further details will not be provided here. However, a cable 88 (or other force transfer device) may be attached to the door latch 86 and the support member 134 so that as the door latch 86 is operated by an operator to manually open the door 66*a*, the cable 88 causes the support member 134 to move in direction A1 so that the third power transfer member 130 is disengaged from the first power transfer member 126; thereby effectively disabling the door checker drive mechanisms 100 and thus preventing it from moving the door 66*a*.

With reference now to FIGS. 1 and 5, the door checker drive mechanisms 100 may also include first and second springs 146, 148 mounted onto the shaft 122 on opposite sides of the second power transfer member 128 to enable the second power transfer member 128 to slide along the shaft 122 between the first and second springs 146, 148 to protect the power source 120 and the drive train 124 in response to an outside force, such as an impact force, applied to the door 66*a*. The springs may be of any type and size chosen with the sound judgment of a person of skill in the art.

With reference now to all the FIGURES, the operation of the door checker drive mechanisms 100 will now be described. To manually adjust the door 66*a* from a closed position to an open position, it is only necessary for the operator to manually adjust the door latch 86 and then manually move the door 66*a* to an open position as is well known in the art. As the door latch 86 is adjusted, however, the cable 88 applies a force to the support member 134 causing it to move in direction A1 and thus causing the third power transfer member 130 to disengaged from the first power transfer member 126 thereby effectively disabling the door checker drive mechanisms 100. To manually adjust the door 66*a* from an open position to a closed position, it is only necessary for the operator to manually move the door 66*a* to a closed position as is well known in the art. When the door 66*a* reaches its fully closed position, however, the door latch 86 will latch, as is well known in the art, to latch the door 66*a* to the body 58. As the door latch 86 latches, however, the force on the cable 88 is removed causing the support member 134 to move in direction A2 and thus causing the third power transfer member 130 to engage with the first power transfer member 126 thereby enabling the door checker drive mechanisms 100.

With continuing reference to all the FIGURES, to automatically adjust the door 66*a* from a closed position to an open position, it is only necessary for the operator to manually adjust the activation device 140 (such as by pressing an "open" button). This action sends an electric signal to the controller 142 which then sends an electric signal to the power source 120 to rotate the shaft 122 in direction B1. The second power transfer member 128 will then also rotate in direction B1 causing the third power transfer member 130 to rotate in direction C1. This rotation of the third power transfer member 130 will then cause the first power transfer member 126 (and thus the door 66*a*) to move in direction D1 to open the door 66*a*. Limit switches (not shown but well known in the art) may be used to stop the operation of the power source 120 once it reaches the full open position. However, if one or more detection sensors 144 are used, and further if they detect an object with in a predetermined distance of the door 66*a*, the control system 138 may use the corresponding signal from the detection sensor 144 to stop the operation of the power source 120 and thus stop the motion of the door 66*a*.

Still referring to all the FIGURES, to automatically adjust the door 66*a* from an open position to a closed position, it is only necessary for the operator to manually adjust the activation device 140 (such as by pressing a "closed" button). This action sends an electric signal to the controller 142 which then sends an electric signal to the power source 120 to rotate the shaft 122 in direction B2. The second power transfer member 128 will then also rotate in direction B2 causing the third power transfer member 130 to rotate in direction C2. This rotation of the third power transfer member 130 will then cause the first power transfer member 126 (and thus the door 66*a*) to move in direction D2 to close the door 66*a*. Limit switches (not shown but well known in the art) may be used to stop the operation of the power source 120 once it reaches the full closed position.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A vehicle comprising:

a frame;

at least one ground engaging wheel mounted to the frame;

a locomotion source mounted to the frame and used in providing locomotion for the vehicle;

a body that is mounted to the frame and that has first and second surfaces;

a door having first and second surfaces, wherein the first surface of the door is pivotally attached to the first surface of the body so that the door is pivotal with respect to the body between an open position granting access to the interior of the body and a closed position preventing access to the interior of the body;

a door checker drive mechanism comprising:

a door checker that limits the motion of the door; the door checker comprising: a first surface attached to the second surface of the body; and, a second surface attached to the second surface of the door;

an electric power source that rotates a shaft;

a drive train that interconnects the electric power source to the door, the drive train comprising: a first gear operatively attached to the door checker, a second gear operatively attached to the shaft; and, a third gear;

a control system supported to the frame for use in controlling the door checker drive mechanism and comprising an activation device; and, wherein the activation device is manually activateable to adjust the door checker drive mechanism between: (1) a first condition where the second gear is engaged with the third gear: the third gear is engaged with the first gear; and, the power source rotates the shaft and causes the door to pivot with respect to the body; and, (2) a second condition where at least one of the first and second gears is not engaged with the third gear; the power source cannot cause the door to pivot with respect to the body; and, the door is manually pivotal with respect to the body.

2. The vehicle of claim 1 wherein:

the door checker drive mechanism further comprises: a support member movably attached to the door;

the electric power source and the third gear are mounted to the support member; and, as the door checker drive mechanism is adjusted from the first condition to the second condition, the support member is moved to disengage the third gear from the first gear.

3. The vehicle of claim 2 wherein:

the first gear is a rack gear;

the second gear is a worm gear;

the third gear is a spur gear; and, the door checker drive mechanism further comprises: first and second springs mounted onto the shaft on opposite sides of the worm gear to enable the worm gear to slide along the shaft between the first and second springs to protect the electric power source in response to an outside force applied to the door.

4. The vehicle of claim 3 wherein:

the door further comprises: a manually adjustable door latch that latches the door to the body: and, the door checker drive mechanism further comprises: a cable operatively connecting the door latch and the support member to move the support member to disengage the third gear from the first gear as the drive mechanism is adjusted from the first condition to the second condition.

5. The vehicle of claim 4 wherein the door checker drive mechanism further comprises:

at least one object detection sensor mounted to the door that limits the rotation of the shaft in response to the detection of an object within a predetermined distance of the door.

6. A door checker drive mechanism for use with an associated body and door that is moveable with respect to the body between an open position granting access to the interior of the body and a closed position preventing access to the interior of the body, the door checker drive mechanism comprising:

a door checker that limits the motion of the associated door, the door checker comprising: a first surface attachable to the associated body; a second surface attachable to the associated door; and a first power transfer member;

a power source that rotates a shaft;

a drive train that interconnects the power source to the associated door, the drive train comprising: a first power transfer member operatively attached to the door checker, a second power transfer member operatively attached to the shaft; and, a third power transfer member; and, wherein the door checker drive mechanism is adjustable between: (1) a first condition where the second power transfer member engages the third power transfer member; the third power transfer member engages the first power transfer member; and, the power source rotates the shaft and causes the associated door to move with respect to the body; and, (2) a second condition where at least one of the first and second power transfer members is not engaged with the third power transfer member; the power source cannot cause the associated door to move with respect to the body; and, the associated door is manually moveable with respect to the body.

7. The door checker drive mechanism of claim 6 wherein:

the first power transfer member is a rack gear;

the second power transfer member is a worm gear; and, the third power transfer member is a spur gear.

8. The door checker drive mechanism of claim 7 wherein:

the door checker drive mechanism further comprises: a support member movably attached to the associated door;

the power source and the spur gear are mounted to the support member; and, as the door checker drive mechanism is adjusted from the first condition to the second condition, the support member is moved to disengage the spur gear from the rack gear.

9. The door checker drive mechanism of claim 6 wherein:

the power source is an electric motor;

the door checker drive mechanism further comprises a control system for use in controlling the door checker drive mechanism and comprising an activation device; and, the activation device is manually activateable to adjust the door checker drive mechanism between the first and second conditions.

10. The door checker drive mechanism of claim 6 wherein:

the door checker drive mechanism further comprises: first and second springs mounted onto the shaft on opposite sides of the second power transfer member to enable the second power transfer member to slide along the shaft between the first and second springs to protect the power source in response to an outside force applied to the door.

11. The door checker drive mechanism of claim 6 wherein:

the associated door has a manually adjustable a door latch that latches the door to the body;

the door checker drive mechanism further comprises: a support member movably attached to the associated door;

the power source and the third power transfer member are mounted to the support member; and, the door checker drive mechanism further comprises: a cable operatively connecting the door latch and the support member to move the support member to disengage the third power transfer member from the first power transfer member as the door checker drive mechanism is adjusted from the first condition to the second condition.

12. The door checker drive mechanism of claim 6 further comprising:

at least one object detection sensor mounted to the door that limits the rotation of the shaft in response to the detection of an object within a predetermined distance of the door.

13. A method comprising the steps of:

(A) providing a vehicle comprising: a frame; at least one ground engaging wheel mounted to the frame; a body that is mounted to the frame; and, a door that is moveable with respect to the body between an open position granting access to the interior of the body and a closed position preventing access to the interior of the body;

(B) providing a door checker drive mechanism comprising: a door checker that limits the motion of the door; a power source that rotates a shaft; a drive train that interconnects the power source to the door, the drive train comprising: a first power transfer member operatively attached to the door checker, a second power transfer member operatively attached to the shaft; and, a third power transfer member; and, a control system for use in controlling the door checker drive mechanism that comprises an activation device;

(C) manually adjusting the door from the closed position to the open position by:

(1) manually adjusting a door latch operatively connected to the door and the body; and, (2) manually moving the door with respect to the body; and, (D) automatically adjusting the door from the closed position to the open condition by:

(1) activating the activation device;

(2) engaging the second power transfer member with the third power transfer member:

(3) engaging the third power transfer member with the first power transfer member; and, (4) rotating the shaft to cause the door to move with respect to the body in a first direction.

14. The method of claim 13 wherein:

step (B) comprises the step of: mounting the power source and the third power transfer member to a support member movably attached to the vehicle; and, step (C)(1) comprises the step of: moving the support member in a first direction to disengage the third power transfer member from the first power transfer member.

15. The method of claim 14 wherein:

step (B) comprises the step of: attaching the support member to the door; and, step (D)(3) comprises the step of: moving the support member in a second direction to engage the third power transfer member with the first power transfer member.

16. The method of claim 13 wherein:

step (B) comprises the steps of: proving the first power transfer member to be a rack gear; attaching the drive mechanism to the door; providing the second power transfer member to be a worm gear; providing the third power transfer member to be a spur gear; and, providing first and second springs onto the shaft on opposite sides of the worm gear; and, the method further comprises the step of: enabling the worm gear to slide along the shaft between the first and second springs to protect the power source in response to an outside force applied to the door.

17. The method of claim 13 wherein:

step (B) comprises the step of: providing at least one object detection sensor to the door;

the method further comprises the step of: limiting step (D)(4) in response to the detection of an object within a predetermined distance of the door.

18. The method of claim 13 wherein:

step (C)(2) comprises the step of: pivoting the door with respect to the body; and, step (D)(4) comprises the step of: causing the door to pivot with respect to the body.

19. The method of claim 13 wherein:

step (C)(2) comprises the step of: sliding the door with respect to the body; and, step (D)(4) comprises the step of: causing the door to slide with respect to the body.

20. The method of claim 13 further comprising the step of:

automatically adjusting the door from the open position to the closed condition by:

(1) activating the activation device;

(2) engaging the second power transfer member with the third power transfer member;

(3) engaging the third power transfer member with the first power transfer member; and, (4) rotating the shaft to cause the door to move with respect to the body in a second direction.

* * * * *